United States Patent
Bauer et al.

(10) Patent No.: US 8,020,246 B2
(45) Date of Patent: Sep. 20, 2011

(54) WIPER BLADE

(75) Inventors: Peter-Josef Bauer, Buehl (DE);
Christian Wilms, Koersel-Beringen (BE); Peter De Block, Halen (BE);
Hubert Verelst, Tienen (BE); David Van Baelen, Winksele (BE); Stefan Mai, Leuven (BE); Hans Beelen, Herk de Stad (BE)

(73) Assignee: Robert Bosch GmbH, Stuttgart (DE)

( * ) Notice: Subject to any disclaimer, the term of this patent is extended or adjusted under 35 U.S.C. 154(b) by 1119 days.

(21) Appl. No.: 11/587,088

(22) PCT Filed: Feb. 22, 2005

(86) PCT No.: PCT/EP2005/050753
§ 371 (c)(1),
(2), (4) Date: Jun. 27, 2007

(87) PCT Pub. No.: WO2005/102801
PCT Pub. Date: Nov. 3, 2005

(65) Prior Publication Data
US 2008/0276404 A1    Nov. 13, 2008

(30) Foreign Application Priority Data

Apr. 21, 2004   (DE) .......................... 10 2004 019 157

(51) Int. Cl.
*B60S 1/40* (2006.01)
*B60S 1/38* (2006.01)
(52) U.S. Cl. .............. 15/250.201; 15/250.32; 15/250.43
(58) Field of Classification Search ............... 15/250.44, 15/250.43, 250.201, 250.32, 250.31, 250.451
See application file for complete search history.

(56) References Cited

U.S. PATENT DOCUMENTS

| 3,114,926 | A | * | 12/1963 | Deibel | 15/250.451 |
|---|---|---|---|---|---|
| 3,696,497 | A | * | 10/1972 | Quinlan et al. | 29/592 |
| 4,309,790 | A | * | 1/1982 | Bauer et al. | 15/250.44 |
| 4,793,020 | A | * | 12/1988 | Stratton et al. | 15/250.46 |
| 5,729,861 | A | * | 3/1998 | Journee | 15/250.351 |
| 6,651,339 | B2 | * | 11/2003 | Mazurkiewicz et al. | 29/896.91 |

(Continued)

FOREIGN PATENT DOCUMENTS

DE          43 20 637          1/1995

(Continued)

*Primary Examiner* — Gary Graham
(74) *Attorney, Agent, or Firm* — Michael Best & Friedrich LLP (57) ABSTRACT

A non-articulated wiper blade (10), which is constructed of a wiper strip (12) having a wiper lip (14), two spring rails (30, 32) and a connecting device (22), wherein the spring rails (30, 32) engage in lateral longitudinal grooves of the wiper strip (12) that are open towards the outside and are clasped by claw feet (28, 68, 76, 108) of a sheet metal claw (24, 64, 72, 106) of the connecting device (22) from an outer narrow side. The claw feet (28, 68, 76, 108) are bent around the narrow sides of the spring rails (30, 32) during the assembly of the sheet metal claws (24, 64, 72, 106), wherein at least one layer (70) and/or an intermediate layer (48, 84) of plastic are provided between the claw feet (28, 68, 76, 108) on the one hand and the spring rails (30, 32) on the other hand, which layers are manufactured separately from the wiper strip (12) and are adapted to the claw feet (28, 68, 76, 108) as well as have a high coefficient of friction on their surface towards the sheet metal claw (24, 64, 72, 106) and towards the spring rails (30, 32).

15 Claims, 6 Drawing Sheets

U.S. PATENT DOCUMENTS

| | | | |
|---|---|---|---|
| 6,836,927 B2 * | 1/2005 | De Block et al. | 15/250.43 |
| 7,546,660 B2 * | 6/2009 | Heinrich et al. | 15/250.201 |
| 2002/0133897 A1 * | 9/2002 | De Block et al. | 15/250.201 |
| 2004/0010882 A1 * | 1/2004 | Breesch | 15/250.201 |

FOREIGN PATENT DOCUMENTS

| | | |
|---|---|---|
| DE | 198 35 065 | 2/2000 |
| DE | 101 13 680 | 10/2002 |
| WO | 02/40329 | 5/2002 |
| WO | 02/087935 * | 11/2002 |
| WO | 2004/002792 * | 1/2004 |

* cited by examiner

WIPER BLADE

BACKGROUND OF THE INVENTION

The invention starts with a non-articulated wiper blade.

A non-articulated wiper blade is known from DE 101 13 680 A1 whose wiper strip is comprised of an elastomer material and has a spoiler situated on its upper side. This spoiler can be formed on directly and be comprised of the same material as the wiper strip or be a separate component made of another suitable plastic. The spoiler can serve as a supporting element of the wiper blade by itself or together with spring rails, which are inserted into lateral longitudinal grooves of the profile of the wiper strip. Mounted on the ends of the wiper blade are caps, whose guide surfaces run in the longitudinal direction of the wiper blade and are adjacent with a slight shoulder to the guide surface of the spoiler. Because of the guide surfaces of the spoiler and the end caps, the air steam increasingly presses the wiper blade against the vehicle window with increasing vehicle speed if the air stream is flowing towards the wiper blade essentially transverse to the longitudinal direction.

In the center region of the wiper blade in a section of the spoiler, a connecting device according to the so-called side-lock system is fastened to the supporting element, in which the wiper arm runs laterally parallel to the wiper blade in the region of the connecting device. It is also known as a so-called overlock system, in which the wiper arm runs above the wiper blade in the region of the connecting device. The connecting device has two claws on each of its side parts, which laterally clasp and hold the spring rails of the supporting element.

A non-articulated wiper blade is known from DE 198 35 065 A1, which has a wiper strip with a wiper lip and a top strip. The top strip is connected to the wiper lip in a usual manner via a rocker bridge, which is delimited by two lateral longitudinal grooves. The top strip has a central longitudinal channel, in which a supporting element is embedded in the form a flat, rectangular spring rail. A connecting element in the form of a sheet metal claw is fastened in the central region of the top strip as related to the longitudinal extension. It has a U-shaped profile with a base adjacent to the top strip and adjacent side walls extending towards the outside in the longitudinal direction of the wiper blade so that the U-shaped profile is open towards the side facing away from the wiper strip. The two side walls are connected to each other in their center region by a joint bolt, which serves to couple the wiper blade to a wiper arm according to the top-lock system. In the vicinity of the front sides of the sheet metal claws, two sheet metal tabs are notched out of each the side walls and these tabs are bent around the top strip and partially clasp the spring rails on the longitudinal sides. The claw feet formed by the tabs are pressed together so far perpendicularly against the wide sides of the spring rail until the sheet metal claw sits secure from displacement on the spring rail. In this case, it is advantageous if the intermediate layer between the sheet metal claw and the spring rail, which is formed in the exemplary embodiments by the top strip of the wiper strip, has a greater coefficient of friction than the sheet metal claw and the spring rail.

This applies in general to materials from which wiper strips are fabricated. The depicted embodiments show spring rails as supporting elements that are fabricated as one piece of a metal, however, they can also be comprised in principle of several individual parts. During the assembly of the sheet metal claws, difficulties are to be expected, however, in the positioning of the spring rails if two spring rails that run essentially parallel are provided.

In addition, a wiper blade with a supporting bracket system is known from DE 43 20 637 A1. A spring rail is provided in a central longitudinal channel. This rail has partial widenings in its end regions, which expand the longitudinal channel towards the outside in a wart-like manner so that the spring rail is secured in the longitudinal direction, particularly when a holding claw of a bow is situated between two wart-like elevations.

SUMMARY OF THE INVENTION

According to the invention, the claw feet are bent around the narrow sides of the spring rails during the assembly of the sheet metal claws. In the process, at least one layer and/or an intermediate layer of plastic are provided between the claw feet on the one hand and the spring rails on the other hand, which layers are manufactured separately from the wiper strip and are adapted to the claw feet as well as have a high coefficient of friction on their surface towards the sheet metal claw and towards the spring rails. Because of the measures in accordance with the invention, the sheet metal claw can also be mounted easily and without additional welding or adhesion even with wiper blades with two spring rails. In this case, the spring rails can be grasped by a device and held at a desired distance by a spacer device. Since the intermediate layer is manufactured separately from the wiper strip and allocated and adapted to the claw feet, it can easily be placed on the spring rails before the wiper strip is mounted. As a result, first the sheet metal claw of the connecting device can be fixed on the spring rails and then the wiper strip can be slid between the spring rails.

The plastic is selected in such a way that, on the one hand, it has the desired frictional behavior on its surface, and, on the other hand, has sufficient strength to withstand the high stresses in the region of the claw feet. In this case, the possibility exists for the base material of the intermediate layer to obtain the desired surface properties through a suitable surface treatment or coating. Furthermore, it is expedient that the claw feet press the layer or the intermediate layer together against the spring rails. This can be accomplished by the claw feet being pressed together perpendicular to the wide sides of the spring rails or by folding over a leg of the claw feet or by lateral compression.

The sheet metal claw can have a wide claw foot on each side of the wiper blade or two narrower claw feet, which are at a distance from one other in the longitudinal direction of the wiper blade and are arranged as a rule in the region of the front sides of the sheet metal claw. The length of the intermediate layers is expediently coordinated with the width of the claw feet. If several claw feet are provided on a longitudinal side of the wiper blade, an intermediate layer can also extend over two or more claw feet.

The intermediate layer is advantageously manufactured of an L-shaped, Z-shaped or U-shaped extruded profile, which is cut to the desired length. In a mounted state, the L-shaped or Z-shaped profile with a bent leg is adjacent to an inner longitudinal edge of the associated claw foot. The U-shaped extruded profile is shifted with its open side towards the spring rails between the legs of the claw feet. In another embodiment of the invention, the intermediate layer is formed by a coating of the claw feet at least on their inner surfaces. In this case, a plastic is used that has the same properties as those of the intermediate layer.

The sheet metal claw is expediently covered towards the outside by a plastic cap, whose outer contour is adapted to the contour of the adjacent spoilers, so that they are smoothly contiguous to the plastic cap optically and harmoniously in terms of flow technology. The joining gap between the spoiler and the plastic cap is bridged by a projection on the spoiler and the plastic cap, respectively, wherein the projections mutually overlap. In terms of function, it is unimportant which of the projections lies on the outer side of the profile. The sheet metal claw is cast in the plastic cap in an advantageous manner and supports itself with internal counter surfaces on the upper wide sides of the spring rails, in that the counter surfaces protrude a little towards the spring rails relative to the upper legs of the claw feet. In this way, the counter surfaces made of plastic replace a corresponding intermediate layer on this side.

As a rule, end caps are mounted and fixed on the ends of the spring rails. The parting line between the end cap and the spoiler is also bridged by a projection on the end cap and on the spoiler, respectively. As a result, it is possible to arrange the spoiler between the end cap and the plastic cap or the sheet metal claw so that it is axially displaceable on the spring rails so that the flexibility of the wiper blade is only negligibly affected in the critical regions by the spoiler.

Instead of the intermediate layers or in addition to the intermediate layers, the spring rails can be secured relative to the sheet metal claw in the longitudinal direction by protuberances, which lie between adjacent claw feet and overlap the inner contour of the claw feet upwardly, downwardly and/or laterally. In order to stabilize the claw feet against one another, they are expediently connected to one another via a bridge. This bridge is advantageously arranged on the inner side of the protuberances.

According to an embodiment of the invention, the protuberance has at least two elevations. It is possible as a result to shift the elevations near the claw feet without the individual elevation having to be relatively large.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
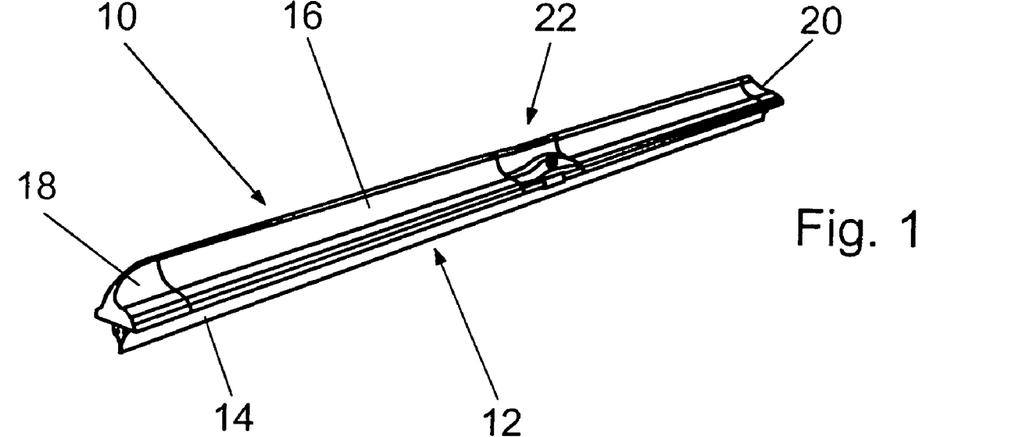
FIG. 1 A perspective view of an assembled wiper blade from above.

A non-articulated wiper blade 10 has essentially a wiper strip 12 with a wiper lip 14 and spoilers 16, on which end caps 18 and 20 are attached towards the ends. A connecting device 22 is provided in the center region of the wiper blade 10, through which the wiper blade 10 can be connected in an articulated manner to a wiper arm (not shown). The connecting device 22 has a sheet metal claw 24 (FIG. 2) and a plastic cap 46 (FIG. 3), which is clipped on the sheet metal claw 24 or on spring rails 30, 32. The spring rails 30, 32 form a supporting element for the wiper blade 10. They are preliminarily bent in such a way that in an unstressed state the wiper blade 10 has a considerably stronger curvature than a vehicle window for which it is intended. If the wiper blade 10 is pressed against the vehicle window by the wiper arm, a distribution of pressure that is suitable for the wiping process is produced over the length of the wiper blade 10.

Figure 2:
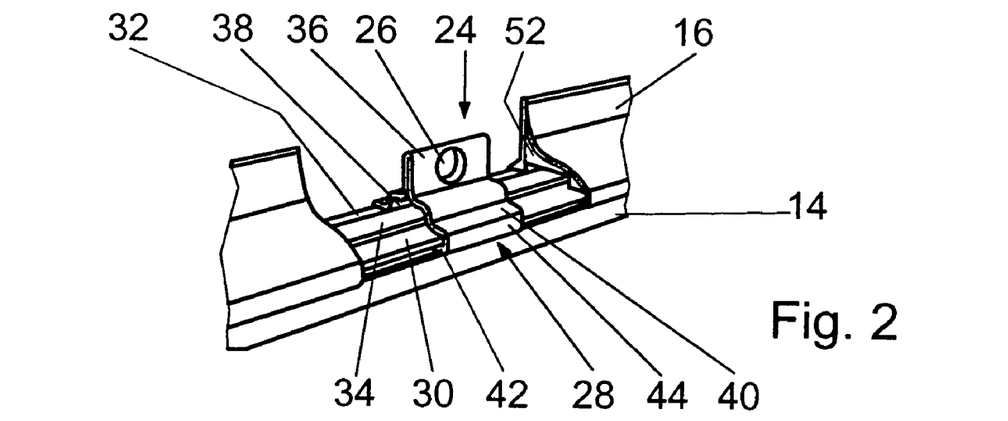
FIG. 2 A perspective view of a partially mounted connecting device in accordance with FIG. 1.
Figure 3:
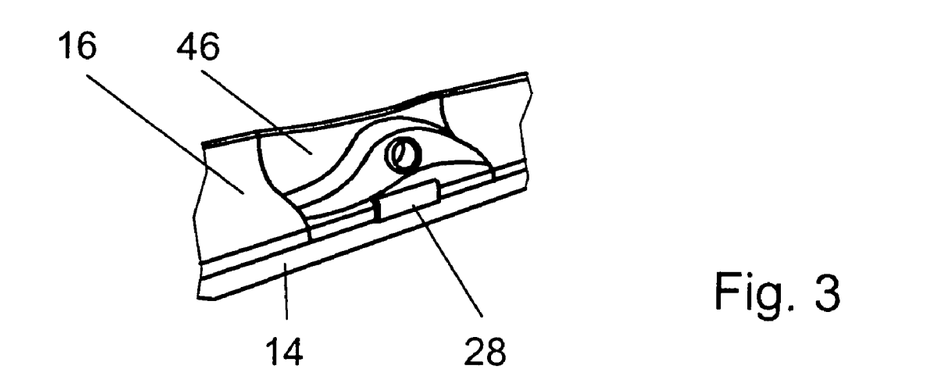
FIG. 3 An enlarged scale of a connecting device in accordance with FIG. 1.

The sheet metal claw 24 is formed from a sheet metal strip, which is folded by 180 degrees in a center part 36, wherein the fold runs in the longitudinal direction of the wiper blade 10 and the sheet metal walls abut one another in the area of the fold. The free ends of the sheet metal strip are bent to the outside, overlap the upper side of the spring rails 30 and 32 and form a free space 38 for a top strip 34 of the wiper strip 12.

During assembly the parts of the sheet metal strip that project laterally over the spring rails 30, 32 are bent twice towards the wiper strip 12 so that claw feet 28, each with a upper leg 40, a side part 44 and a lower leg 42, are formed. The lower leg 42 clasps the spring rails 30, 32 from below (FIG. 5) and is pressed against the upper leg 40 so that the spring rails (30, 32) are clamped between the legs 40, 42.

Applied between the claw feet 28 and the spring rails 30, 32 is an intermediate layer 48 made of a plastic (FIG. 4) whose coefficient of friction vis-à-vis the spring rails 30, 32 is greater than that of the material of the sheet metal claw 24. However, the plastic must also be suitable to absorb the very high stresses and surface pressures in the region of the claw feet 28. The claw feet 28 can be dimensioned to be sufficiently large in the longitudinal direction, thereby enlarging the contact surfaces and therefore reducing the surface pressures.

Figure 9:
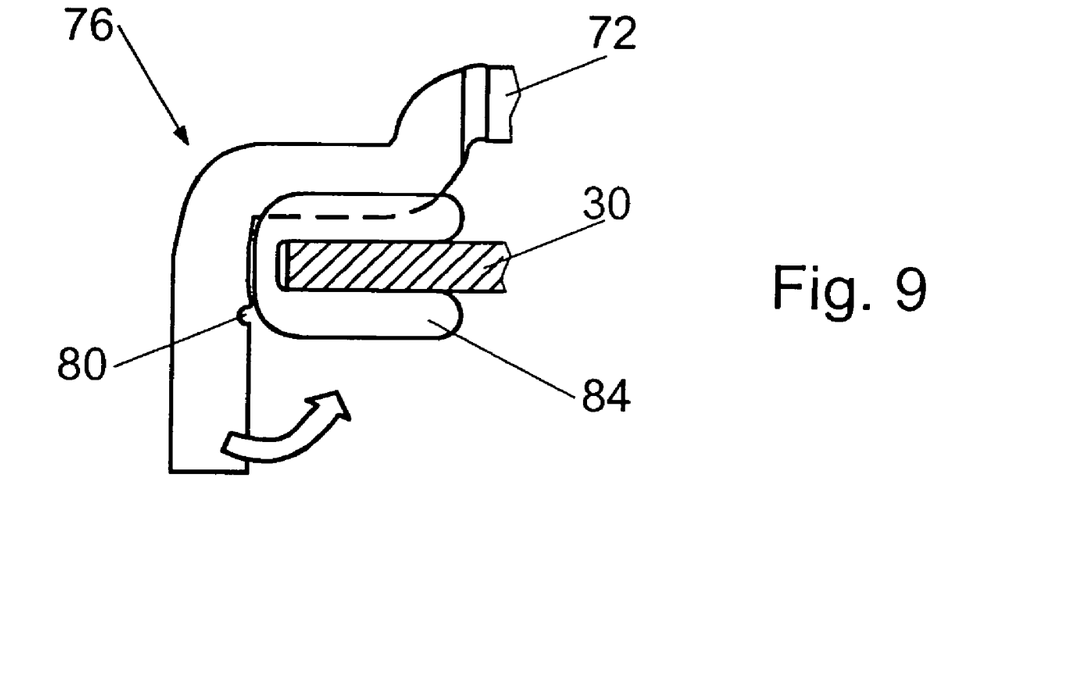
FIG. 9 A partial view of a sheet metal claw according to FIG. 7 in the longitudinal direction, whose claw feet press the intermediate layer together by folding over a claw leg.
Figure 10:
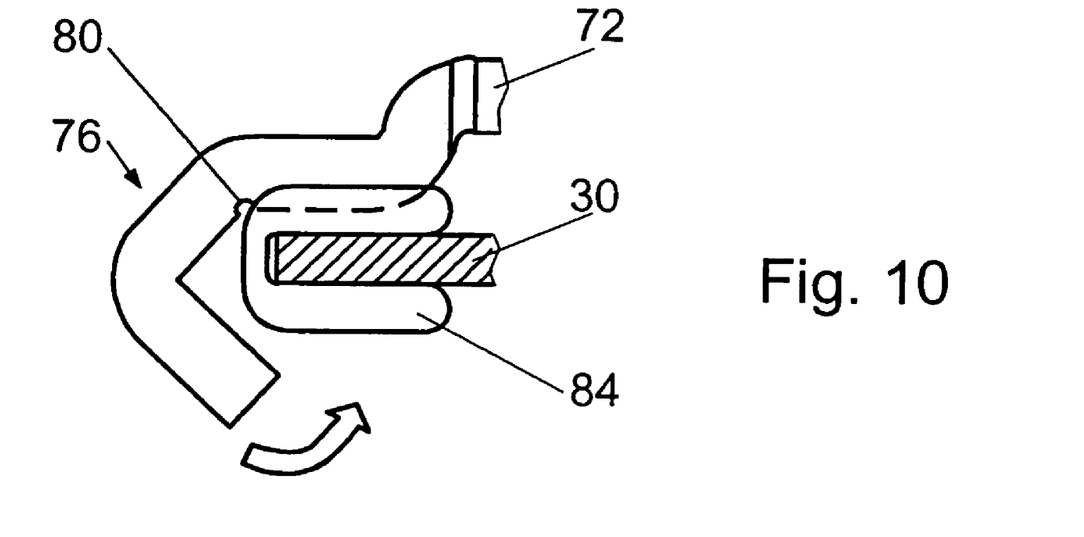
FIG. 10 A partial view of a sheet metal claw according to FIG. 7 in the longitudinal direction, whose claw feet press the intermediate layer together via lateral compression.

During the folding over of the claw feet 28 and the pressing process approximately perpendicular to the wider surfaces of the spring rails 30, 32, they are fixed vis-à-vis one another at a prescribed distance via a spacer device 58. In doing so, the intermediate layer 48 is pressed together somewhat against the spring rails 30, 32. An intermediate space 56 is formed between the spring rails 30, 32, into which the wiper strip 12 will later be inserted, wherein the top strip 34 lies on the side of the spring rails 30, 32 facing the connecting device 22. There is also the possibility of pressing the claw feet 28, 76 against the spring rails 30, 32 by folding over the lower leg 42 of said claw feet (FIG. 9) or by lateral compression of the claw feet 76 (FIG. 10).

Figure 4:
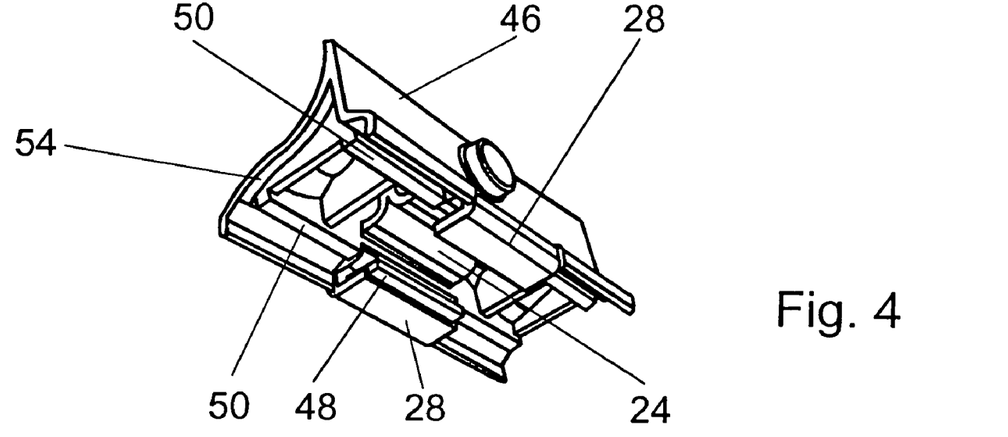
FIG. 4 A perspective view from below of a connecting device without a supporting element.
Figure 5:
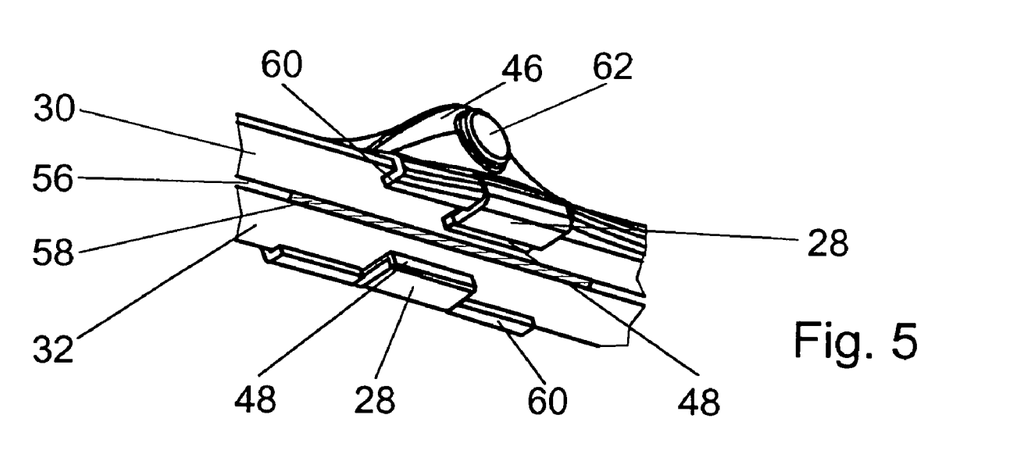
FIG. 5 A perspective view from below of a connecting device with a supporting element.

In the embodiment according to FIG. 4, the sheet metal claw 24 is cast in the plastic cap 46, but the sheet metal parts of the claw feet 28 remain free so that they can be bent in the course of subsequent assembly. The plastic cap 46 with the sheet metal claw 24 is mounted on the spring rails 30, 32 (FIG. 5), wherein guide strips 60 of the plastic cap 46 grasp the spring rails 30, 32 from below. On the upper side of the spring rails 30, 32, the plastic cap 46 supports itself via counter surfaces 50 on the spring rails 30, 32. The counter surfaces 50 project somewhat relative to the upper leg 40 of the claw foot 28 so that on this side there is no metallic contact between the claw foot 28 and the spring rail 30, 32. When bending the lower leg 42 of the claw foot 28, an intermediate layer 48 of plastic is inserted between the lower leg 42 and the associated spring rail. Its length corresponds to the width of the claw foot 28. It is cut expediently from an extruded profile with an L-shaped or Z-shaped cross-sectional profile. A leg of the extruded profile is adjacent to the inner edge of the claw foot 28 (FIGS. 4 and 5). The sheet metal claw 24 is provided for the articulated connection to the wiper arm according to the so-called sidelock principle. As a result, it has a bearing bore hole 26, which runs coaxial to a bearing opening 62 of the plastic cap 46.

Figure 6:
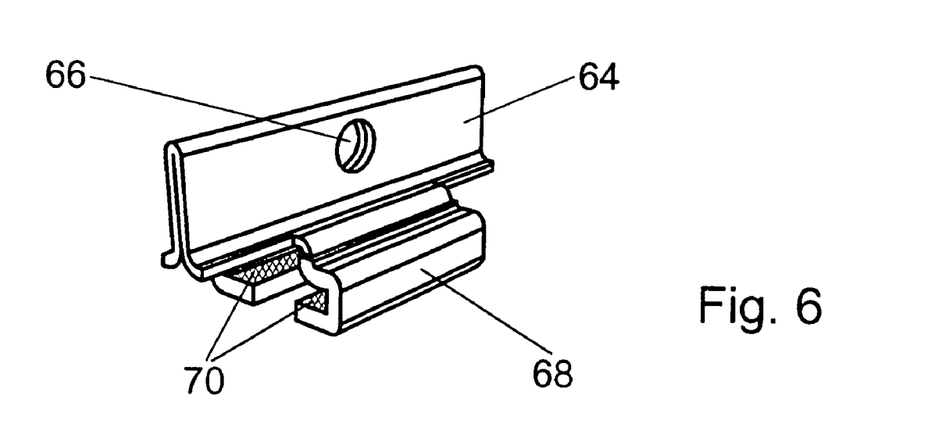
FIG. 6 A variation of a sheet metal claw according to FIG. 2.

The sheet metal claw 64 with a bearing bore hole 66 has claw feet 68, which are coated at least on their inner surfaces with a layer 70 of plastic. The plastic of the layer 70 has the same properties as the plastic of the intermediate layer 48. It adheres firmly to the sheet metal parts so that the layer 70 does not detach when folding over the claw feet 68.

Figure 7:
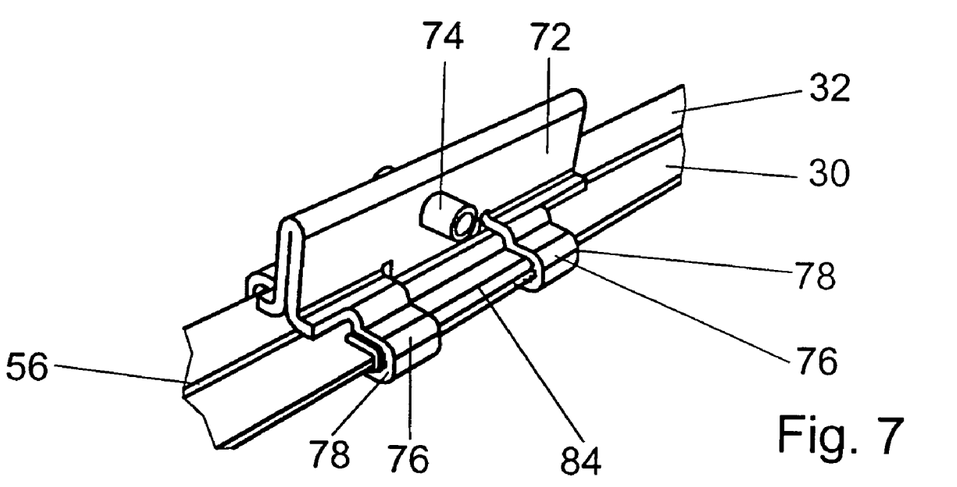
FIG. 7 A variation of a sheet metal claw according to FIG. 2.
Figure 8:
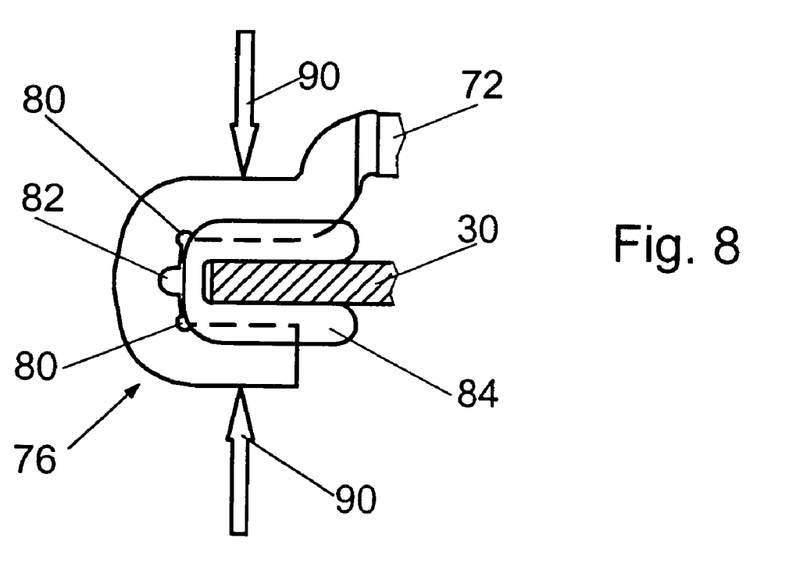
FIG. 8 A partial view of a sheet metal claw according to FIG. 7 in the longitudinal direction, whose claw feet press the intermediate layer together perpendicular to the wide sides of the spring rails.

The sheet metal claw 72 according to the embodiment in FIG. 7 is embodied for connection to the wiper arm in accordance with the so-called overlock principle. As a result, it has a bearing pin 74 in its center part. Moreover, it differs from the sheet metal claw 24 by the fact that it has two claw feet 76 on each side of the wiper blade 10. Allocated to said claw feet is an intermediate layer 84 of plastic, which extends between the outer front sides 78 of the claw feet 76. It has a U-shaped extruded profile. The claw feet 76 are formed of sheet metal parts of the sheet metal claw 72, in that they are bent around the outer longitudinal side of the spring rails 30, 32 and then pressed against one another in a pressing direction 90. In doing so, the intermediate layer 84 or the layer 70 yields elastically a little. In order to facilitate the bending process and avoid fissures in the hollow channels, predetermined bending points 80 with a rounded out cross section are provided in the hollow channels of the claw foot 76. Located between said predetermined bending points approximately in the center of the side part is another predetermined bending point 82, via which controlled shaping of the claw foot 76 is guaranteed.

Figure 11:
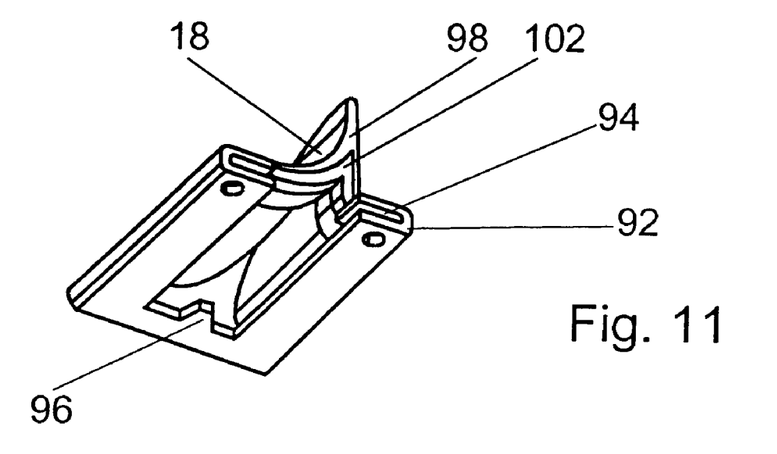
FIG. 11 A perspective representation from below of an end cap.
Figure 12:
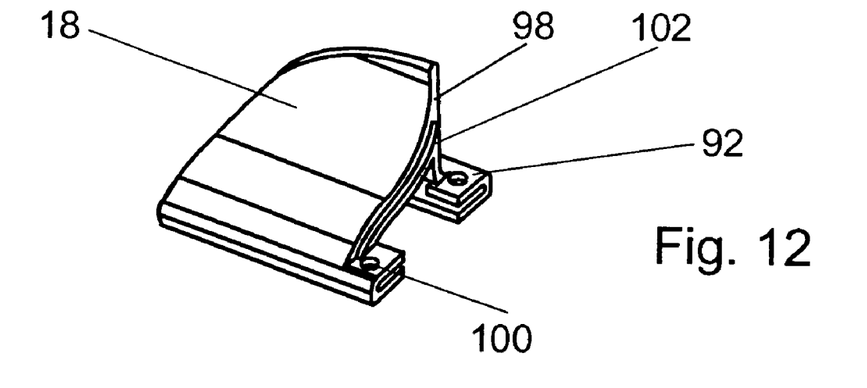
FIG. 12 A perspective representation from above of an end cap in accordance with FIG. 11.
Figure 13:
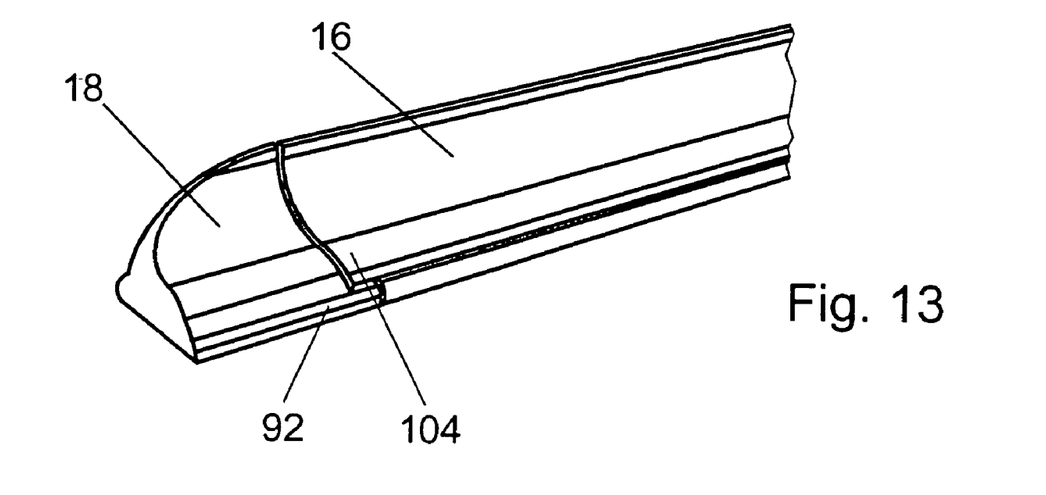
FIG. 13 A perspective view of an end of an assembled wiper blade.

After assembly of the wiper strip 12, the end caps 18, 20 are mounted and fastened on the ends of the spring rails 30, 32, e.g., by gluing, clipping, welding or the like. For this purpose the spring rails 30, 32 have guide profiles 92, into whose guide slot 94 the spring rails 30, 32 are inserted. A wedge-shaped projecting part 96 on the closed end of the end caps 18, 20 extends into the intermediate space 56 and presses the spring rails 30, 32 apart. The lateral guide profiles 92 can protrude vis-à-vis a front wall 98 towards the spoiler 16 and have a hole 100 in the projecting part transverse to the guide slot 94. The hole 100 can be used to pin the end caps 18, 20 together with the spring rails 30, 32. The end caps 18, 20 have the same outer profile as the spoilers towards the spoilers 16 so that like the plastic cap 46 they are smoothly contiguous to the spoiler 16.

The joining gaps between the spoiler 16 and the plastic cap 46 are bridged by projections 52 on the spoilers and projections 54 on the plastic cap 46, which mutually overlap. In this case, it is unimportant which of the projections 52, 54 is arranged towards the outside. Between the end caps 18, 20 and the spoilers 16, the joining gap is also bridged in the same way by projections 102 on the end caps 18, 20 and projections 104 on the spoilers 16. In this case, projections 104 on the spoilers 16 can cover the projecting parts of the guide profiles 92 with the holes 100 to the outside. The projections 102, 104 make an axial displacement of the spoilers 16 possible between the end caps 18, 20 on the one hand and the plastic cap 46 on the other.

Figure 14:
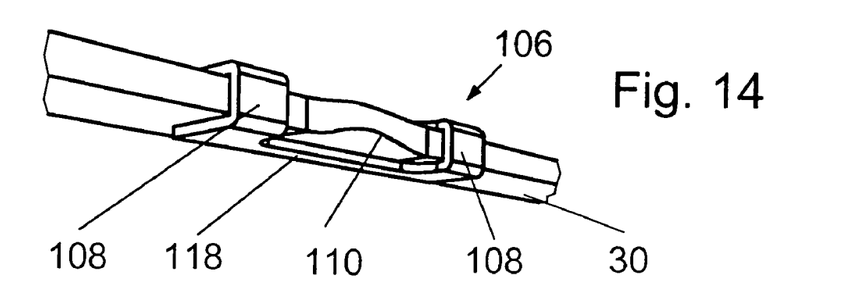
FIG. 14 A perspective partial representation of a spring rail with a protuberance and a sheet metal claw FIGS. 15 to 17 Variations of the embodiment in accordance with FIG. 14.
Figure 15:
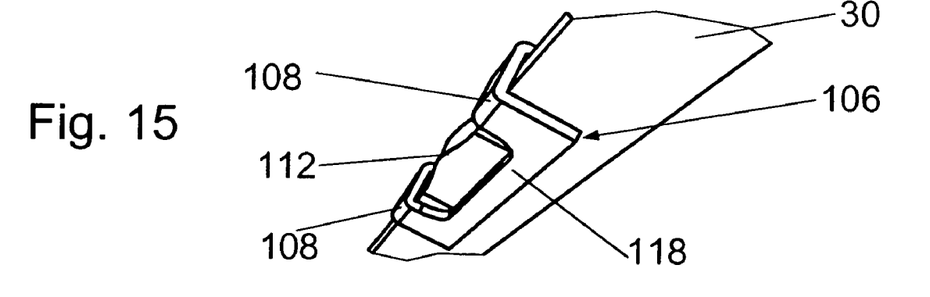

The spring rails 30 according to the embodiments in FIGS. 14 through 15 have protuberances 110, 112, 114 and 116, which lie in the area of the outer longitudinal sides of the spring rails 30, 32 between two adjacent claw feet 108 of a sheet metal claw 106. In this case, the embodiment according to FIG. 14 shows a protuberance 110 upwards towards the center part of the sheet metal claw 106.

The free legs of the claw feet 108 are connected to one another via a bridge 118 on the under side of the spring rail 30.

Figures 16, 17:
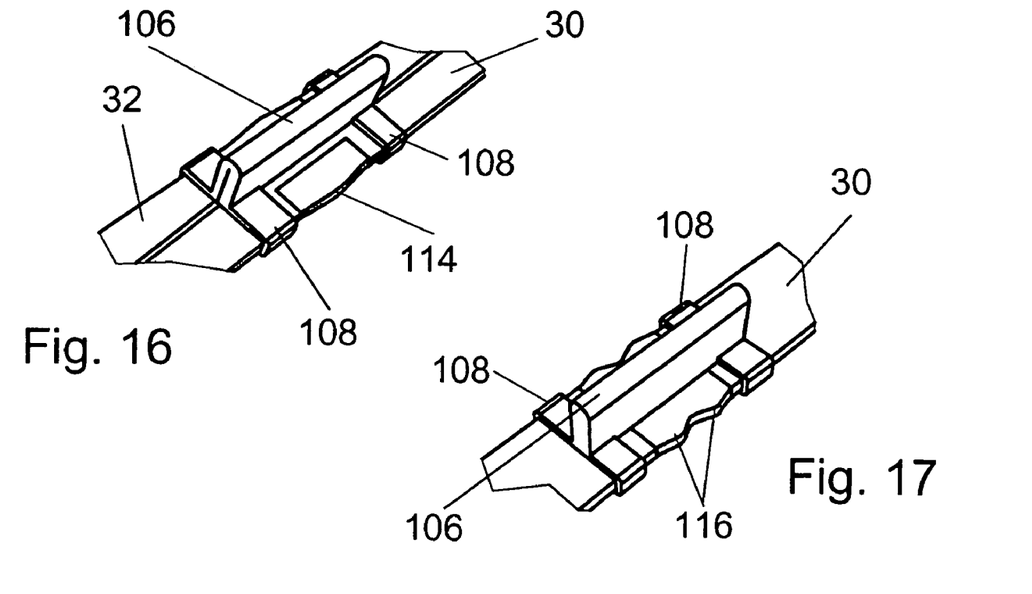

The protuberance 112 according to FIG. 15 extends towards the side and upwards, while the protuberance 114 according to FIG. 16 only extends towards the side. The protuberance 116 has two elevations in the longitudinal direction so that the side surface of the spring rail 30 runs in an undulated way.

The invention claimed is:

1. Wiper blade (10), which is constructed of a wiper strip (12) having a wiper lip (14), two spring rails (30, 32) and a connecting device (22), wherein the spring rails (30, 32) engage in lateral longitudinal grooves of the wiper strip (12) that are open towards the outside and are clasped by claw feet (28, 68, 76, 108) of a sheet metal claw (24, 64, 72, 106) of the connecting device (22) from an outer narrow side, characterized in that the claw feet (28, 68, 76, 108) are bent around the narrow sides of the spring rails (30, 32) during the assembly of the sheet metal claws (24, 64, 72, 106), wherein an intermediate layer (48, 84) of plastic is provided between the claw feet (28, 68, 76, 108) and the spring rails (30, 32), which layers are manufactured separately from the wiper strip (12) and are adapted to the claw feet (28, 68, 76, 108) as well as have a high coefficient of friction on their surface towards the sheet metal claw (24, 64, 72, 106) and towards the spring rails (30, 32), and characterized in that each claw foot extends to a free end providing an inner longitudinal edge of the claw foot, the intermediate layer covering the inner longitudinal edge of each claw foot.

2. Wiper blade (10) according to claim 1, characterized in that the claw feet (28, 68, 76, 108) press the layer (70) or the intermediate layer (48, 84) together against the spring rails (30, 32).

3. Wiper blade (10) according to claim 1, characterized in that the intermediate layer (48) has a profile that is L-shaped or Z-shaped in cross section and a bent crosspiece on the inner longitudinal edge of the associated claw foot (28).

4. Wiper blade (10) according to claim 1, characterized in that the intermediate layer (84) is an extruded profile that is U-shaped in cross section and open towards the spring rails (30, 32), which is adapted in terms of its length to the width of a claw foot (28) or to the distance of the outer fore parts (78) of two adjacent claw feet (76).

5. Wiper blade (10) according to claim 1, characterized in that the claw feet (68) are coated at least on their inner surfaces with a layer (70) of plastic.

6. Wiper blade (10) according to claim 1, characterized in that the sheet metal claw (24) is cast in a plastic cap (46), which supports itself with counter surfaces (50) on upper wide sides of the spring rails (30, 32), in that the counter surfaces (50) protrude towards the spring rails (30, 32) relative to the upper legs (40) of the claw feet (28).

7. Wiper blade (10) according to claim 1 with a spoiler (16) on each of two front sides of a plastic cap (46), characterized in that the plastic cap (46) has the same outer cross-sectional contour as the spoiler (16) towards the spoilers (16) and overlaps a projection (52) on the spoilers (16) with a projection (54) in an axially displaceable manner.

8. Wiper blade (10) according to claim 7 with end caps (18, 20), characterized in that the spoilers (16) are arranged in an axially displaceable manner on the spring rails (30, 32) between the connecting device (22) and the end caps (18, 20), wherein the end caps (18, 20) are fastened on the spring rails (30,32), have the same outer cross-sectional contour as the spoilers (16) towards the spoilers (16) and overlap projections (104) on front sides of the spoilers (16) with projections (102) on their front sides (98) with play.

9. Wiper blade (10) according to claim 1, characterized in that the sheet metal claw (24) is cast in a plastic cap (46).

10. Wiper blade (10) according to claim 9, characterized in that the plastic cap (46) has counter surfaces (50) supported on upper wide sides of the spring rails (30, 32), and in that the counter surfaces (50) protrude towards the spring rails (30, 32) relative to the upper legs (40) of the claw feet (28), the upper legs (40) of the claw feet (28) not engaging the upper wide sides of the spring rails (30, 32).

11. Wiper blade (10) which is constructed of a wiper strip (12) having a wiper lip (14), two spring rails (30, 32) and a connecting device (22) with a connecting portion for connection to a wiper arm, wherein the spring rails (30, 32) engage in lateral longitudinal grooves of the wiper strip (12) that are open outwardly and are clasped by claw feet (28, 68, 76, 108) of a sheet metal claw (24, 64, 72, 106) of the connecting device (22) from an outer narrow side, characterized in that the sheet metal claw (106) has at least two claw feet (108) on an outer side of one spring rail (30, 32), between which the spring rail (30, 32) has a protuberance (110, 112, 114, 116), which overlaps the claw feet (108) upwardly, downwardly and/or laterally, characterized in that the one spring rail (30, 32) has opposite wide sides, and characterized in that the claw feet (108) are connected via a bridge (118), the bridge (118) engaging along one opposite wide side of the one spring rail (30, 32), the connecting portion of the connecting device (22) being on the other opposite wide side of the one spring rail 30, 32).

12. Wiper blade (10) according to claim 11, characterized in that the protuberance (116) has at least two elevations.

13. Wiper blade (10) according to claim 11, characterized in that the claw feet (28, 68, 76, 108) have at least one predetermined bending point (80) on one of their inner hollow channels.

14. Wiper blade (10) according to claim 13, characterized in that the claw feet (28, 68, 76, 108) have a further predetermined bending point (82) between their inner hollow channels.

15. Wiper blade (10), which is constructed of a wiper strip (12) having a wiper lip (14), two spring rails (30, 32) and a connecting device (22), wherein the spring rails (30, 32) engage in lateral longitudinal grooves of the wiper strip (12) that are open towards the outside and are clasped by claw feet (28, 68, 76, 108) of a sheet metal claw (24, 64, 72, 106) of the connecting device (22) from an outer narrow side, characterized in that the claw feet (28, 68, 76, 108) are bent around the narrow sides of the spring rails (30, 32) during the assembly of the sheet metal claws (24, 64, 72, 106) to provide upper legs (40) above the spring rails (30, 32) and lower legs (42) below the spring rails (30, 32), wherein at least one layer (70) and/or an intermediate layer (48, 84) of plastic are provided between a portion of the claw feet (28, 68, 76, 108) and the spring rails (30, 32), which layers are manufactured separately from the wiper strip (12) and are adapted to the claw feet (28, 68, 76, 108) as well as have a high coefficient of friction on their surface towards the sheet metal claw (24, 64, 72, 106) and towards the spring rails (30, 32), the at least one layer (70) and/or an intermediate layer (48, 84) of plastic not being provided between the upper legs (40) of the claw feet (28, 68, 76, 108) and upper wide sides of the spring rails (30, 32), and characterized in that the sheet metal claw (24) is cast in a plastic cap (46), the plastic cap (46) having counter surfaces (50) supported on the upper wide sides of the spring rails (30, 32), the counter surfaces (50) protruding further towards the spring rails (30, 32) relative to upper legs (40) of the claw feet (28) and preventing the upper legs (40) of the claw feet (28) from engaging the upper wide sides of the spring rails (30, 32).

* * * * *